Mar. 27, 1923. 1,449,862
J. J. KROHN
METHOD OF MANUFACTURING SAWDUST FOR GRAPE PACKING
Filed Oct. 14, 1922
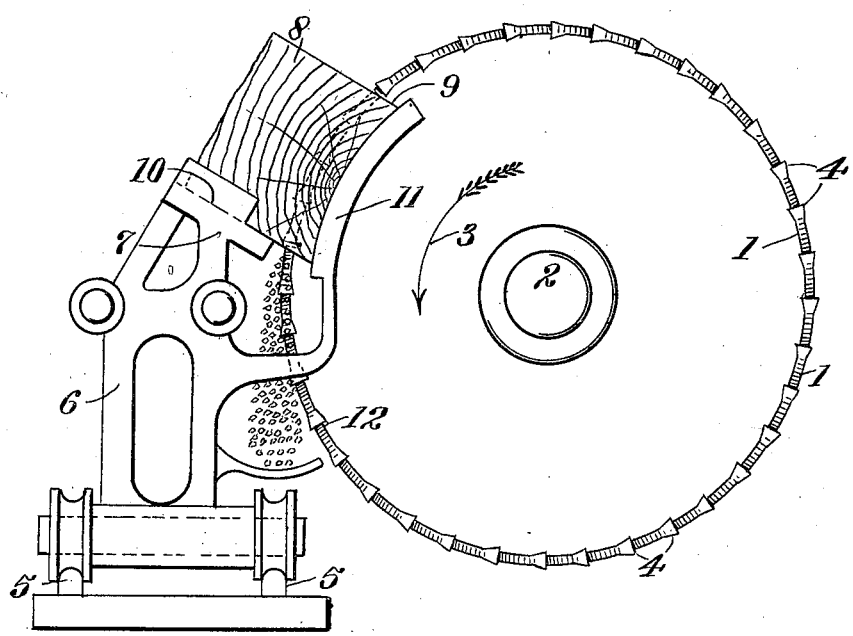
Inventor.
Julius J. Krohn.

Patented Mar. 27, 1923.

1,449,862

UNITED STATES PATENT OFFICE.

JULIUS J. KROHN, OF ARCATA, CALIFORNIA, ASSIGNOR TO CALIFORNIA BARREL CO., OF SAN FRANCISCO, CALIFORNIA, A CORPORATION OF CALIFORNIA.

METHOD OF MANUFACTURING SAWDUST FOR GRAPE PACKING.

Application filed October 14, 1922. Serial No. 594,628.

*To all whom it may concern:*

Be it known that I, JULIUS J. KROHN, a citizen of the United States, residing at Arcata, in the county of Humboldt and State of California, have invented certain new and useful Improvements in Methods of Manufacturing Sawdust for Grape Packing, of which the following is a specification.

In the packing and transporting of certain perishable materials, particularly fruit, and more specifically grapes, it has become the practice to pack the same in small barrels or kegs containing sawdust. This packing permits the maintaining of the commodity in cold storage for some time without noticeable deterioration. The packing employed is commonly known as sawdust, but the same is not to be confused with the ordinary run of sawdust of the mill, as only that sawdust of substantially cubical structure is adaptable for use in the packing of grapes.

In cooperage factories wherein the shipping containers or barrels have been previously manufactured, the staves therefor have been cut from the slabs by cylinder saws having spring teeth. The spring toothed saw will make a relatively narrow kerf in forming the staves and produce a quality of sawdust which is unfit for use as grape packing, and which is cast aside as waste material.

The present invention relates to a method whereby the cooperage plant in making containers or barrels for the transporting of grapes, simultaneously with the sawing or forming of the staves, produce a kind and grade of sawdust adaptable for use as grape packing, thereby utilizing the whole slab in the furthering of the transporting and preservation of grapes.

In carrying out my present method invention, I am enabled to conserve the forests by eliminating waste material in the form of sawdust in the manufacture of staves, and thereby adapting a cooperage plant equipped to manufacture barrels or containers for the shipping and storing of grapes packed in sawdust with a constant yield of properly sized grape packing or sawdust, which may be delivered to the user separately or simultaneously with the delivery of the kegs, barrels or containers.

In carrying out my present invention, I prefer to use spruce and fir, as from past experience the same has produced the most desirable stave for this purpose and also the most desirable white sawdust for grape packing, it being free from splinters and adapted for ready cutting in substantially cubical form.

The sawed bolts of spruce or fir as received from the woods are bolted in any well known manner into slabs preferably four inches in thickness, which are equalized to desired lengths and are trucked or transported to the respective cylinder saws for sawing into staves. The saws for cutting the slabs into staves are provided with what is known as a swage set, the action of which is to cut or chisel small particles of the wood when making the kerf to form the stave. The cylinder saws may be either straight or bilge, and are adapted for use in any of the well known types of stave machines, such as that No. 364 manufactured by B. D. Whitney, of Winchendon, Massachusetts.

To more fully comprehend my method invention and the carrying out of the same, reference is directed to the end elevation of a simple type of stave sawing machine illustrated in the accompanying drawing.

In the apparatus illustrated 1 indicates the preferred form of cylinder saw rotatable on an axis 2 in the direction of the arrow 3. The open end of the cylinder saw is provided with swage set teeth 4. Movable parallel with the saw 1 on tracks 5 is a carriage 6 having a cradle 7 for receiving the bolted material 8 to be cut into staves 9. The cradle has an inclined bed 10 and the inner face of the stave cut from the bolt rests at one end against a support 11 movable in a plane within the periphery of the saw.

The movement of the bolt to and from the swage toothed end 4 of the saw 1 in severing successive staves therefrom causes the swage set teeth to cut or chisel a kerf 14 endwise through the bolt and in so doing providing a quantity of cubical sawdust 12 which may be collected in a trough 13 and periodically removed therefrom.

The successive feeding of the slab to the swage teeth of the saw in the cutting of the staves therefrom provides a constant and even yield of properly sized sawdust adapted for use as a grape packing in the containers or barrels when the same are finished. Any desired disposal of the staves or removal thereof from the sawing machine may be made, and the collection of the sawdust may be accomplished in any well known manner, and if desired the same may be screened to remove the splinters and fine dust therefrom.

By this method of making keg, barrel or container staves by the utilization of a swage set saw, a cooperage plant need not purchase from an outside source sifted and screened sawdust 80 per cent of which is waste and useless material for use as grape packing, as the kerf formed by the swage set saw provides a known yield of sawdust particularly adapted for grape packing.

Having thus described my invention, what I claim as new and desire to protect by Letters Patent of the United States is:—

1. The method of making staves for the subsequent assembly into barrels or containers for the storage of grapes within a sawdust packing, which consists in sawing from a slab with a saw having swage set teeth successive staves, and simultaneously therewith providing from the kerf a substantially cubical grained dust for depositing within the barrels on their assembly.

2. The method of making staves which consists in sawing a slab with a cylinder saw having swage set teeth for the production of a stave and a substantially cubical grained sawdust.

In testimony whereof I have signed my name to this specification.

JULIUS J. KROHN.